C. POOL.
Hay-Loader.
No. 211,424. Patented Jan. 14, 1879.
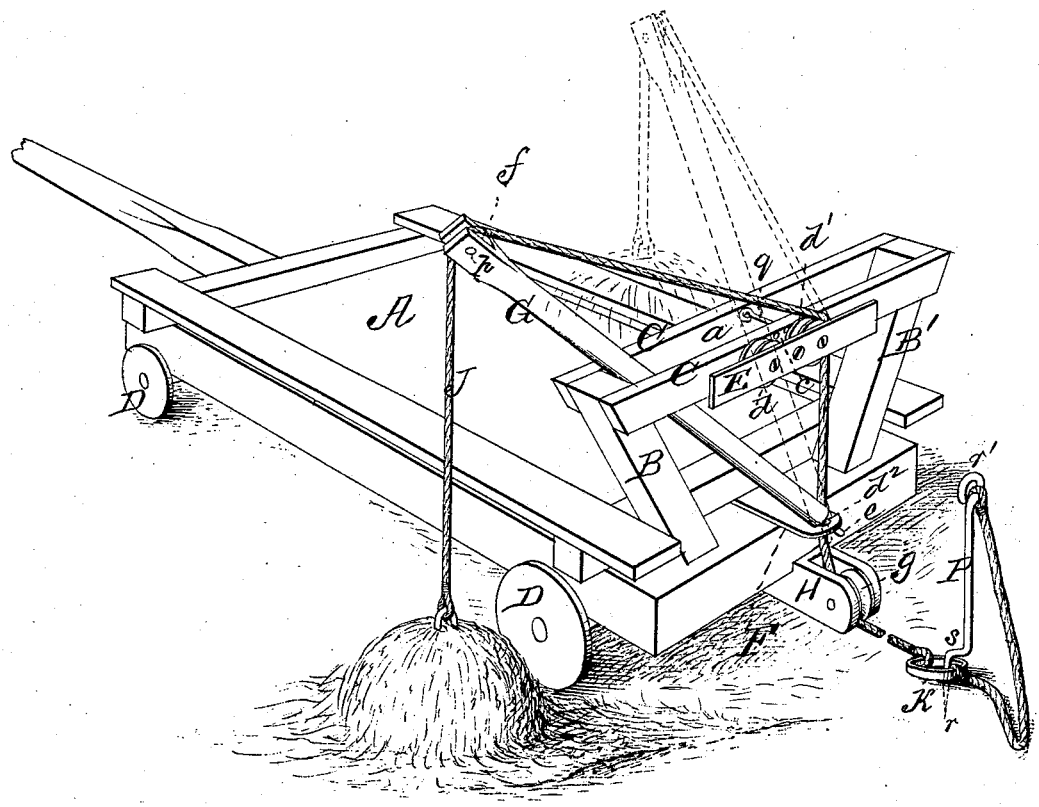
WITNESSES
INVENTOR
Cyrus Pool,
by E. W. Anderson,
ATTORNEY

UNITED STATES PATENT OFFICE.

CYRUS POOL, OF OTTAWA, ILLINOIS.

IMPROVEMENT IN HAY-LOADERS.

Specification forming part of Letters Patent No. 211,424, dated January 14, 1879; application filed November 23, 1878.

*To all whom it may concern:*

Be it known that I, CYRUS POOL, of Ottawa, in the county of La Salle and State of Illinois, have invented a new and valuable Improvement in Hay-Loaders; and I do hereby declare that the following is a full, clear, and exact description of the construction and operation of the same, reference being had to the annexed drawing, making a part of this specification, and to the letters and figures of reference marked thereon.

The drawing is a representation of a perspective view of my improved hay-loader.

This invention has relation to improvements in devices for loading hay upon a wagon-rack from the ground or stack.

The object of the invention is, principally, to devise means whereby the forward movement of the wagon will be made to supply power for operating the hoisting-rope and lifting the hay into the wagon.

The nature of the invention consists in the combination, with a hay-wagon having a pulley at its rear end, the raised transverse guides upon its rear part, and pulleys at each side of the center of the guides, of a derrick-pole universally jointed to the wagon and swinging between the said guides, a pulley in the end of said pole, and a hoisting-rope passing over said pulleys and adapted to be fastened to the ground, as will be hereinafter more fully set forth.

In the annexed drawing, the letter A designates an ordinary hay wagon or rack mounted upon transporting-wheels D, and drawn by a suitable team. B B' represent two strong uprights erected at the rear end of the rack and connected together by two horizontal beams, C, between which is a vertical space, $a$, extending across the wagon from upright B to upright B'. At the middle of the length of the rear beam C is rigidly secured a strong block, $c$, to which is permanently secured a metallic plate, E, that, with the beam C, affords bearings to two vertically-arranged pulleys, $d$ $d^1$, situated one at each side of block $c$. The object of these pulleys will hereinafter appear.

F indicates a metallic step-plate projecting horizontally from the body of the wagon directly under the block $c$, and provided with a step-hole, $d^2$, adapted to receive a step-pin, $e$, on the lower end of a derrick-pole, G. This pole has in its upper forked end a pulley-wheel, $f$, and is stepped in plate F by passing it between the spaced bars C aforesaid. It vibrates freely from side to side of the rack.

H indicates an arm projecting to the rear from the wagon-body, and provided at its extremity with a vertical pulley, $g$. The hoisting-rope J is passed over the pulley $f$ of the pole G, and is prevented from escaping therefrom by a pin, $p$, passing through the fork of the pole above the said rope. It passes from pulley $f$ downward around that one of the pulleys $d$ $d^1$ farthest from the heap of hay, thence under the pulley $g$ of arm H a sufficient distance to the rear, its end being provided with a ring, K. The rack is driven up alongside of the hay-heap to be loaded, the fork buried therein, and picket P driven through the ring at the rear end of the hoisting-rope. The team is then started toward the next heap of hay, and, the hoisting-rope being fast to the picket, the load on the fork is hoisted up to pulley $f$, and the pole then swung in toward the center of the wagon in a vertical position, or nearly so, against an adjustable stop-pin, $q$, extending through the spaced beams C. By letting go the hoisting-rope the pile of hay is lowered to the wagon. To shift the derrick-pole to the other side, remove pin $q$, swing the said pole over to the opposite end of the guides C, and, having replaced the pin, shift the rope to the other pulley, $d$. It will then serve to raise a heap of hay on the opposite side of the rack. Sometimes the derrick-pole may be attached to the plate F by a universal ball-and-socket joint instead of by the step pin and plate.

The picket P is usually a bar of iron of suitable rigidity, having a drive-point, $r$, at one end, and a handle-loop, $r'$, at the other. It also has, at a sufficient distance above the point, a shoulder, $s$, by means of which it is easily forced into the ground.

In connection with this loader I usually employ a harpoon hay-fork; but its effect is the same with other forks.

Having thus described my invention, what I claim as new, and desire to secure by Letters Patent, is—

1. In a hay-loader, the combination, with a hay wagon or rack having the raised transverse guides C and the spaced pulleys $d$ $d^1$ on said guides, of the rotating and vibrating derrick-pole G, having a pulley, $f$, in its upper end, the hoisting-rope J, and the pulley $g$ on the wagon-body, substantially as specified.

2. The combination, with a wagon having the raised transverse guides C and a pulley, $g$, of a derrick-pole extending between said guides and universally jointed to the wagon, a hoisting-rope, F, the spaced pulleys $d$ $d^1$, and a picket, P, adapted to be driven through a ring on said rope, substantially as specified.

In testimony that I claim the above I have hereunto subscribed my name in the presence of two witnesses.

CYRUS POOL.

Witnesses:
SIDNEY R. BLANCHARD,
CHAS. S. CULLEN.